3,146,092
PROCESS FOR PURIFYING HAFNIUM

Harold H. Morse, Mariemont, and Raymond A. Foos, Loveland, Ohio, assignors to National Distillers and Chemical Corporation, New York, N.Y., a corporation of Delaware
No Drawing. Filed May 4, 1960, Ser. No. 26,687
3 Claims. (Cl. 75—84)

This invention relates to a novel method for purifying or refining metals. More particularly, the invention pertains to a method for substantially reducing the non-metallic contaminants of metals such as hafnium having high melting points.

The presence of non-metallic contaminants in metals has caused fabricators considerable trouble for many years. Impurities such as oxides, carbides, and nitrides tend to accumulate at the grain boundaries of the metals which, consequently, yield meatl products of low strength and low workability. There have been many attempts in this field to effect either the dispersion of these impurities throughout the metal lattice or the removal of these impurities from the metals. It has previously been found that oxygen can be removed to relatively low levels by high temperature vacuum melting. The removal of oxygen is readily effected because the disassociation pressure of the oxides is sufficiently low or the vapor pressure of the metal oxides is sufficiently high at the melting point of the metal to permit the removal of oxides. The vacuum melting technique is, however, ineffective for the removal of carbon and nitrogen from these refractory metals, since the carbides and nitrides are stable and non-volatile at these high temperatures. Even though the oxygen is reduced below contaminating levels, it has been found that nitrogen and carbon contents in the order of 100 to 300 parts per million will seriously impair the workability, strength, corrosion resistance, and general usefulness of the metals. Other metal melting techniques such as drip melting and arc melting, which are employed to effect purification, also consistently failed to remove the non-metallic contaminants, and the metal products had high Brinell hardness values as well as the other disadvantages referred to above.

One object of this invention is to provide a method for effectively removing non-metallic contaminants from high melting point metals. Another object of the invention is to provide a method for reducing the carbon and nitrogen impurities in metals below contaminating levels. A further object of this invention is to provide a metal purification technique which results in the production of metal products having acceptable Brinell hardness values, improved workability, etc. A still further object of the invention is to provide an improved purification method which utilizes the techniques and apparatus of conventional methods such as electron beam melting, arc melting, drip melting, and the like. Other objects of this invention will become apparent from the ensuing description.

These and other objects of the invention are attained by the addition of a metal sulfide to the crude refractory metal, compressing the resulting mixture to form rods, bars or other substantially solid shapes, and then melting the solid shape so formed by conventional techniques. By operating in this manner it was found that the resulting refractory metal product or ingot was substantially freed of non-metallic impurities or had these non-metallic impurities reduced below contaminating levels. In general, the method of this invention is applicable to the purification of metals having high melting points such as:

| | |
|---|---|
| Titanium | Tungsten |
| Zirconium | Rhenium |
| Hafnium | Vanadium |
| Molybdenum | Platinum |
| Thorium | Nickel |
| Tantalum | Silicon |
| Columbium | Uranium |

Rare earth metals, having atomic numbers from 57 to 72, may also be employed with equally effective results. The use of reactive-refractory metals is, however, preferred. It will be further understood that the method of this invention is also applicable to the purification of alloys of the above metals with each other as well as with other metals. Another aspect of the invention is the direct formation of the alloy during melting by incorporating the sulfide of alloying metal in the metal being treated.

In accordance with the preferred method of operation, the corresponding metal sulfide is admixed with the crude high melting point metal. Thus, for example, in purifying crude hafnium metal the metal sulfide would be hafnium sulfide. However, in accordance with the broader aspect of the invention, it will be understood that other metal sulfides such as iron sulfide, nickel sulfide, zirconium sulfide, sodium sulfide, titanium sulfide, silicon sulfide, aluminum sulfide, and the like can be utilized to achieve the removal of undesirable non-metallic contaminants. Although the exact mechanism by which the inventive method operates is not fully understood, it is believed that the sulfide reacts with the carbon to form the volatile carbon disulfide. The mechanism for nitrogen is uncertain, although it is clear that by practicing the method of this invention substantial removal of nitrogen is also accomplished. The amount of metal sulfide employed need only be sufficient to result in the removal or the reduction of the non-metallic impurities in the crude metal below contaminating levels. In general, however, the amount of metal sulfide will range from about 0.10 to 10 weight percent of the crude metal. If the formation of an alloy during the purification treatment is desired, the amount of metal sulfide employed may vary over a wide range and may constitute, for example, as much as 100 weight percent of the crude metal.

As previously set forth, conventional melting and purification techniques and apparatus can be employed in carrying out the method of this invention. Although vacuum melting techniques, such as electron beam melting, are preferred, it is possible to use melting techniques, such as induction heat and consumable or non-consumable arc melting, which require inert gas atmospheres, e.g. helium or argon. It will be understood, however, that the particular type of melting apparatus employed is not an essential feature of this invention, and that the melting techniques and apparatus shown in following U.S. patents are applicable to the method of this invention: 848,600, issued to Von Pirani; 2,688,169, issued to Gruber et al.; 2,789,152, issued to Ham et al.; 2,796,644, issued to Kuhn; 2,809,905, issued to Davis et al.; 2,848,524, issued to McLaughlin et al.; 2,866,700, issued to Bohnet et al.; and 2,890,109, issued to Cooper. Since the melting apparatus described in these patents are known to the art and are generally available commercially, there is no need to describe here details of their particular structure or operation. It is essential for the present purification method, however, to obtain a molten phase or to effect some degree of melting, thereby insuring adequate contact of the metal sulfide with the non-metallic impurities.

Conventional compression or compaction apparatus can also be employed to form the rods, bars, briquets, etc. which are employed in the above melting means, from the mixtures of crude metal and metal sulfide. The crude metal may initially be in the form of metal sponge, powder, platelets, chunks, and the like.

The invention will be more fully understood by reference to the following illustrative examples.

EXAMPLE I

Approximately 150 grams of hafnium powder were converted into a compress. This compress was vacuum melted in a conventional electron emission furnace using 8 kv. at 0.5 amp at the anode and 11 volts at 85 amps on the emitter. The melting pressure of the system at its termination was 0.4 micron. Following this melt, the resulting ingot was allowed to cool to room temperature, discharged from the melter, and analyzed. It showed a Brinell hardness of 190 and an oxygen content of 100 p.p.m. The button was turned over and melted again using 6.5 kv. at 0.8 amp on the anode and 9 volts at 71 amps on the emitter until a final pressure of 0.05 micron was obtained in the melting unit. The Brinell hardness of this button upon cooling was 192 (3000 kg. load in all cases). A third and fourth melt, under the same conditions used for the second melt, showed no decrease in hardness as the final ingot had a Brinell hardness of 191. Metallic and non-metallic impurities of this hafnium after the four melts are given below. It will be noted from these data that metallic impurities and oxygen were extremely low; therefore, they obviously did not contribute appreciably to the hardness of the hafnium metal product. Nitrogen and carbon levels were 51 and 150 p.p.m., respectively, thus indicating that carbon especially contributes to the hardness.

*Analysis of Hafnium Product* [1]

| Component: | Concentration, p.p.m. |
|---|---|
| Aluminum | <1.0 |
| Cadmium | <0.5 |
| Cobalt | <5 |
| Chromium | 17 |
| Iron | 50 |
| Magnesium | <10 |
| Manganese | <5 |
| Nickel | <10 |
| Lead | <10 |
| Silicon | 55 |
| Tin | <5 |
| Titanium | <10 |
| Vanadium | <10 |
| Oxygen | 100 |
| Nitrogen | 51 |
| Carbon | 150 |

[1] Spectrographic analysis, based on hafnium.

EXAMPLE II

The conditions of Example I were repeated with the exception that 0.57 gram of $HfS_2$, or about 20% excess based on carbon content, were added to 150 grams of hafnium prior to compressing and melting. Brinell hardness values for the cooled ingots upon successive melting were 197, 187, and 164. The final ingot contained 100 p.p.m. oxygen, 75 p.p.m. carbon, and 29 p.p.m. nitrogen.

EXAMPLE III

The conditions of Example II were repeated except that 0.75 gram of hafnium sulfide were added to 160 grams of the hafnium powder. The Brinell hardness after the first and second melts were 179 and 164, respectively, thus showing the beneficial effect achieved when employing increased concentrations of hafnium sulfide.

The above data demonstrate that by addition of hafnium sulfide to crude hafnium metal prior to melting reduced the carbon and nitrogen levels to low and acceptable values. The addition of more hafnium sulfide and extended melting times would be expected to lower these carbon and nitrogen impurity levels to an even greater degree.

To further show the beneficial results attained by practicing the method of this invention, the final ingots prepared in Examples I and II were subjected to cross section reduction studies in a five inch Stanat rolling mill. Severe edge cracking was noted for the ingot prepared in Example I, i.e. without the presence of hafnium sulfide, after only 10 percent reduction. Only mild edge cracking occurred after 30 percent reduction when testing the ingot prepared in Example II, i.e. the use of hafnium sulfide. These tests indicate that the addition of hafnium sulfide to hafnium prior to melting yields a product with improved metallurgical properties. This property improvement is directly attributable to reduction of carbon and nitrogen impurities.

While particular embodiments of this invention are shown above, it will be understood that the invention is obviously subject to variations and modifications without departing from its broader aspects. For example, as stated above, various metals and alloys thereof may be purified in accordance with the method of this invention. In addition, the corresponding metal sulfide need not necessarily be employed, although this procedure is preferred when high purity metal is desired. Finally, the use of particular melting techniques or apparatus does not constitute an essential feature of this invention.

What is claimed is:

1. A method for removing carbon and nitrogen impurities from hafnium metal which consists of admixing hafnium sulfide with said hafnium metal, melting the resulting admixture and recovering a hafnium metal product that is substantially free from said carbon and nitrogen impurities.

2. The method of claim 1 wherein the amount of hafnium sulfide ranges from about 0.1 to 10 weight percent of the hafnium metal.

3. The method of claim 1 wherein the melting is carried out by electron melting under vacuum.

References Cited in the file of this patent

UNITED STATES PATENTS

| | | |
|---|---|---|
| 2,005,540 | Fleming et al. | June 18, 1935 |
| 2,727,936 | Boyer | Dec. 20, 1955 |
| 2,801,915 | Erasmus | Aug. 6, 1957 |
| 2,821,506 | Wainer | Jan. 28, 1958 |
| 2,866,700 | Bohnet et al. | Dec. 30, 1958 |
| 2,880,483 | Hanks et al. | Apr. 7, 1959 |
| 2,995,439 | Litz | Aug. 8, 1961 |